Figure 1:
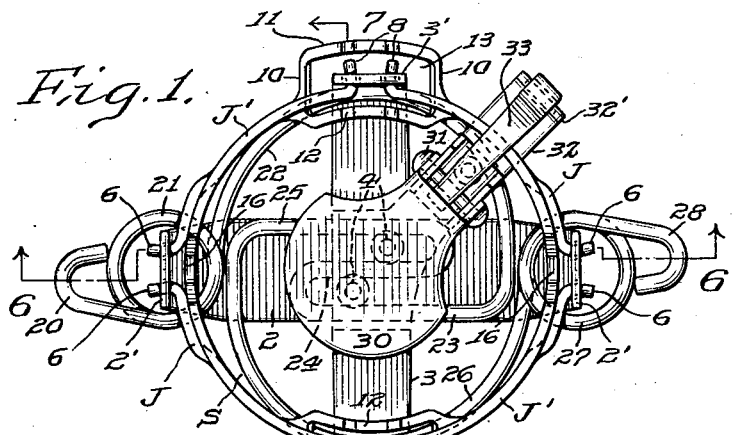

INVENTOR
Leopold C. Schneider.

June 9, 1931.  L. C. SCHNEIDER  1,808,907
TRAP
Filed April 11, 1929  3 Sheets-Sheet 2
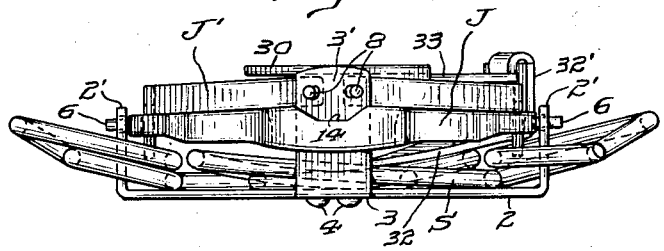
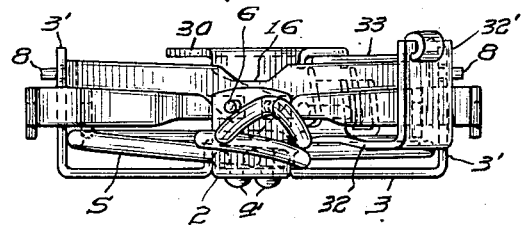
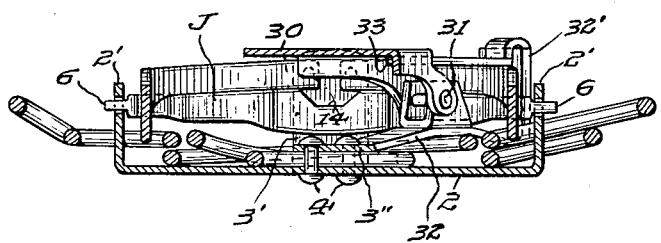
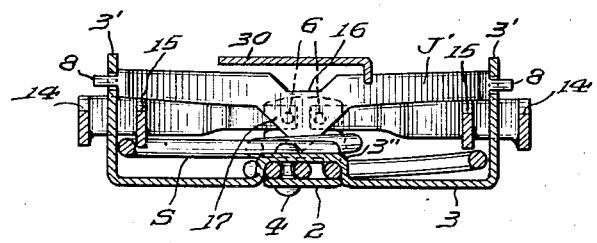
INVENTOR
Leopold C. Schneider June 9, 1931.  L. C. SCHNEIDER  1,808,907
TRAP
Filed April 11, 1929    3 Sheets-Sheet 3

INVENTOR
Leopold C. Schneider.

WITNESS

Patented June 9, 1931

1,808,907

UNITED STATES PATENT OFFICE

LEOPOLD C. SCHNEIDER, OF HATBORO, PENNSYLVANIA

TRAP

Application filed April 11, 1929. Serial No. 354,221.

A principal object of my invention is to provide an animal trap of the double jaw type, that is, one embodying two pairs of jaws respectively disposed at right angles to each other and mutually cooperative to hold the animal when they are closed or substantially closed together and also embodying a spring of the double type, that is, a spring cooperative with both sides of one of the pairs of jaws which, in turn, are operative through means hereinafter described to move the other pair of jaws when the first pair is moved through the direct action of the spring whereby, when the trap is sprung, the several jaws simultaneously close together.

A further object of my invention is to provide an animal trap embodying a plurality of jaws of such character and so arranged that as they approach closed position they define a generally circular opening at the approximate center of the trap which gradually diminishes in size in correspondence with further movement of the jaws so that they close about the leg of the animal disposed in this opening from all sides and with an ever tightening grip until the animal is finally and positively held in the trap when the jaws can no longer move inwardly in opposition to the resistance offered by the animal's leg, and in which position the jaws are then positively locked.

A still further object of the invention is to provide a trap so constructed and of such character as to minimize as far as possible the pain and suffering of an animal caught therein, this result being attained both because of the action of the jaws in exerting a substantially even pressure entirely around the animal's leg as just described, and also because of the fact that the sharp blow and direct pressure which is ordinarily exerted against the animal's leg upon the closing thereagainst of a pair of jaws directly actuated by a spring is, in accordance with my invention, somewhat modified through the interaction of the pair of spring controlled jaws with the other pair whose closure is effected thereby and not directly from the spring; thus, the closing force of the spring actuated jaws is not, as in the usual trap construction, delivered in a sharp blow directly against the animal's leg but is to some extent resolved against and distributed to the other or free pair of jaws and both pairs of jaws are thus caused to move against the animal's leg with a sort of squeezing, although of course very rapid, action which, while extremely effective to seize and hold the animal, does not tend to break, mutilate or even cut the leg.

My invention further contemplates, among other things, the general improvement and simplification of animal traps and the component parts thereof; the arrangement of the latter so as to minimize liability of the trap becoming inoperative through freezing or the accumulation of snow or other foreign matter; the provision of an animal trap of relatively simple construction which can be manufactured and sold at a relatively low price yet which, nevertheless, is eminently satisfactory for the performance of its intended function, as well as other objects, advantages and novel features of design, construction and arrangement hereafter more particularly pointed out or which will be apparent to those skilled in the art from the following description of a trap constructed in accordance with my invention and illustrated in the accompanying drawings.

Figure 2:
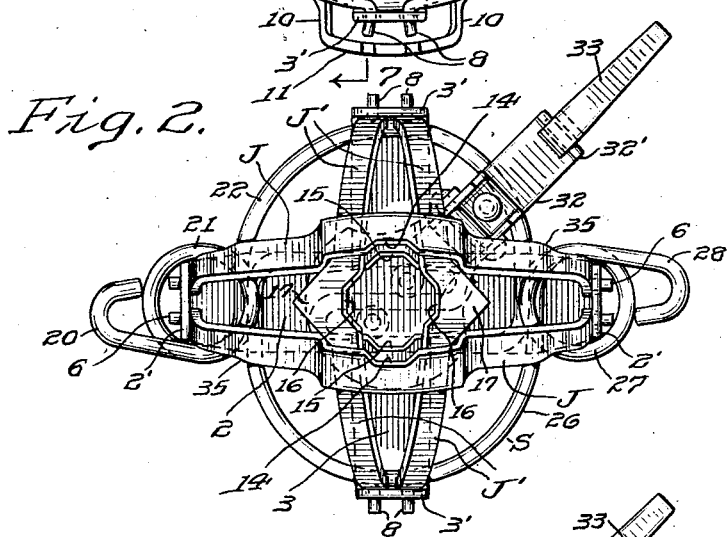
Figure 3:
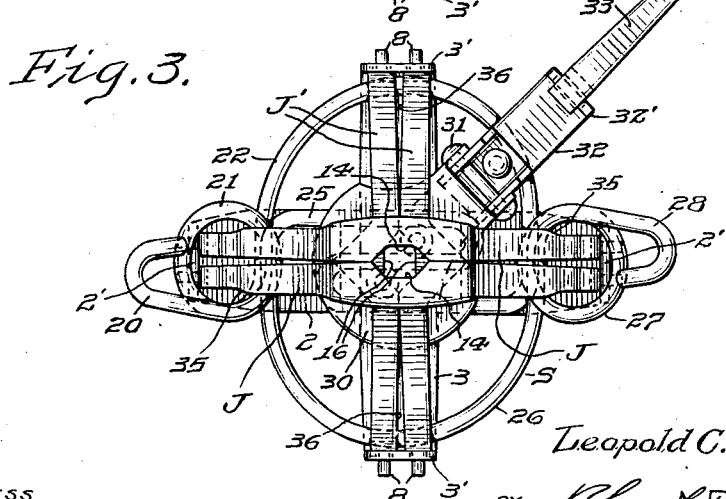
Figure 8:
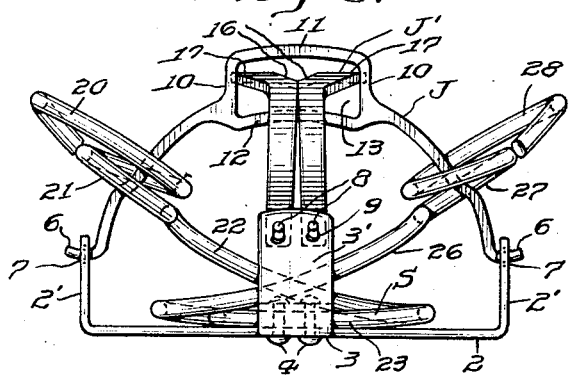

In the said drawings Fig. 1 is a top plan view of the trap in open or "set" position; Fig. 2 is a similar view thereof after the trap has been sprung and the jaws have moved upwardly to partially closed position, and Fig. 3 is a similar view showing the trap in fully closed position. Fig. 4 is a side elevation of the trap as shown in Fig. 1 looking in the direction of the arrows on the section line 6—6 in said figure, and Fig. 5 is also a side elevation thereof but looking in the direction of the arrows on the section line 7—7 in Fig. 1. Fig. 6 is a vertical section of the trap on line 6—6 in Fig. 1 and Fig. 7 a like section on line 7—7 in said figure. Fig. 8 is a side elevation of the trap with the jaws closed and Fig. 9 a similar view, the trap in these two figures being viewed respectively in the same directions as in Figs. 4 and 5 and the pan, trigger and adjacent mechanism being omitted for the sake of clearness. Figs. 10 and 11 respectively illustrate slightly modified forms of jaws either of which may be employed if desired in place of the spring actuated jaws shown in the preceding figures. The same symbols of reference are used to denote the same parts in the several figures.

As shown, the trap comprises a base formed by a pair of substantially flat members 2, 3 disposed at right angles to each other and coincident at their center portions, the ends of these members being respectively turned up at right angles to the major portions thereof to form ears 2′, 3′. These base members may desirably be stamped from flat metal, the center portion of the member 3 where it crosses the other member being upwardly offset as at 3″ to afford a space for the reception of the center part of the spring, generally designated as S, hereinafter more fully described, and which as best shown in Fig. 1 is bent back and forth on itself into a generally S-shape in such manner that three parallel reaches of the spring which rest on the member 2 extend through the channel formed by the offset portion 3″ so that when the parts are assembled and the coincident portions of the base members united by rivets 4 which pass between the reaches of the spring, the base members are firmly held together and the spring is also firmly held in place between them.

As hitherto stated, the trap is provided with two pairs of jaws, one pair of which, generally designated as J, is operated directly from the spring, while the other pair, generally designated as J′, is operated from the jaws J. Each of the jaws J has its ends 6 turned oppositely outward and rounded off for pivotal reception in holes 7 formed in the ears 2′ which are bent over the ends of the jaws when the trap is assembled. And in a similar way the ends 8 of the jaws J′ are rounded off and extended through holes 9 in the ears 3′; thus, each pair of jaws is free to move vertically from open to closed position or vice versa.

Figure 9:
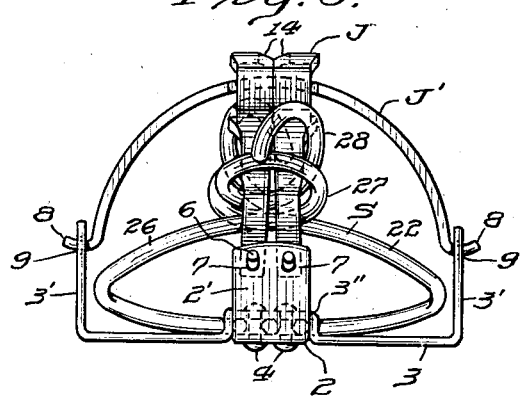
Figures 10, 11:
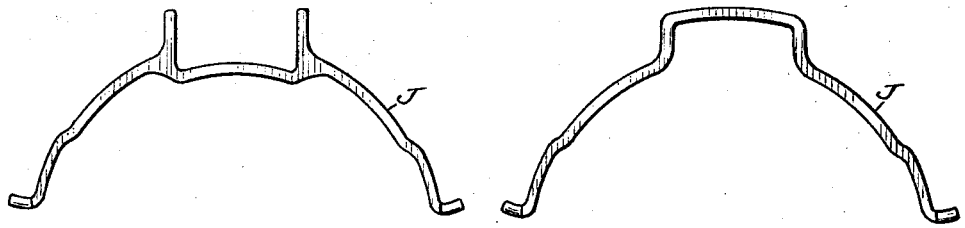

Each of the jaws J from its outer ends 6 is curved inwardly toward its center so that the jaw as a whole when viewed from the side as in Fig. 8 is of generally arcuate shape while the jaws J′ of the other pair, as best shown in Fig. 9, approximate a similar form. In that form of the invention illustrated in Figs. 1 to 9 inclusive the jaws J adjacent their centers are outwardly offset as at 10—10 and the outer extremities of the offsets connected by a bridge 11 while the inner extremities thereof are similarly connected by a bridge 12, both of said bridges being of arcuate shape, whereby an opening or slot 13 is formed at the center of each jaw. As best shown in Figs. 2 and 3, each of the bridges 11 is cut out at the center of its inner edge so as to form, preferably, a three-sided notch 14 and each lower bridge 12 is similarly cut out to form, preferably, a substantially similar three-sided notch 15, the length and disposition of the sides of the notches being such that when the jaws are closed a substantially polygonal opening is defined by the notches 14 and a similar subjacent opening by the notches 15, each so disposed that its greatest dimension is coincident with the meeting edges of the jaws. The size of the notches is such, moreover, that the openings formed thereby when the jaws are fully closed is smaller than the leg of the animal for which the trap is intended.

The jaws J′ extend through the slots 13 in the jaws J and at their centers are respectively provided with notches 16 substantially similar to those in the latter so that when the jaws J′ are closed a similar opening will be defined therebetween, the several openings in all of the jaws being thus in vertical alignment. Each of the jaws J′ is also provided adjacent its center with an outwardly projecting V-shaped portion whose edges 17 are oppositely angularly disposed to the general plane of the jaw and are respectively adapted to be engaged by the adjacent offsets 10 of the jaws J so as to thereby form, in effect, camming surfaces along which the offsets travel during the latter part of the closing movement of the jaws.

When the jaws J are constructed as above described, they do not effectively lend themselves to manufacture by a stamping or similar operation but must ordinarily be cast. This form of jaw, however, besides being very strong is extremely effective in holding the animal since it engages the leg both above and below the jaws J. Thus, while I ordinarily prefer to use the same I may, instead, employ for the jaws J either of the types shown in Figs. 10 and 11, in the first of which it will be noted that the outer bridge is omitted and in the second that the inner bridge is similarly omitted. Both of these jaws can be readily formed by stamping or similar operations and are thus generally less expensive than the type employing both outer and inner bridges; as they are in other respects similar to the latter and operate when assembled in the trap in a similar way, further description of them would be superfluous.

The power for closing the trap is supplied by the spring S to which reference has previously been made. This spring is formed from a single piece of spring wire bent in a peculiar way and arranged to directly actuate the jaws J. Thus, beginning at the left hand end of the spring when viewed as in Fig. 1, it will be noted that the wire is bent upon itself to form an ear 20 of generally semi-circular form, is then again bent upon itself to form a complete loop 21 adapted to surround the adjacent ends of the jaws J, and is finally, as at 22, carried downwardly and also in a generally semi-circular curve approximately conforming to the curvature of the adjacent jaw and thence over and substantially across the opposite end of the base member 2. From this point the wire is carried along the edge of this base member under the offset part of the other base member 3 as at 23, then bent back upon itself and again carried under said member as at 24 and finally again bent back on itself and carried again under the member 3 along the opposite edge of the base member 2 as at 25. From this point the wire is carried transversely across the base member, then brought around the opposite side of the trap in a substantially semi-circular curve as at 26 and simultaneously bent upwardly as well, then carried around the opposite ends of the jaws J in a full coil 27 and finally terminated in a semi-circular ear 28 corresponding to the ear 20. It is thus apparent that the convolutions of the spring are symmetrical though oppositely disposed with respect to the center of the trap and that the power of the spring which is directly effective in actuating the jaws J results from bending the ends of the spring down from their normal position as shown in Fig. 8 to their compressed position as shown in Fig. 4 while the trap is being set and in which position they are releasably maintained by the jaws J bearing down on the coils 21 and 27.

For releasably holding the jaws in this position, a pan 30 is provided which overlies the center of the trap and is pivoted by a horizontal pivot 31 to a channel-shaped lug riveted to or formed integral with a flat outwardly extending support 32 which may desirably be integral with the base member 3 conveniently with the central upwardly offset portion 3″ thereof. This support terminates at its outer end beyond the line of the jaws when the trap is set and is there turned up to form a lug 32′ which is provided with a horizontal slot through which the outer end of the trigger 33 is extended and then turned over as best shown in Fig. 5 whereby the trigger is freely vertically movable with respect to the lug. Thus, when the jaws are forced down to open position in setting the trap, the trigger can be swung inwardly over the adjacent jaw J and then entered for a short distance under the pan adjacent its pivot in the ordinary way as shown in Fig. 1 so as to hold the jaws open until pressure is exerted on the pan, as by an animal stepping thereon, sufficient to move it slightly about its pivot and thus release the trigger. The moment this occurs, the coils 21 and 27 of the spring travel upwardly along the lower or outer portions of the jaws J, thereby lifting these jaws and closing them rapidly toward each other. Simultaneously, however, the jaws J′ are also moved upwardly and toward each other by the offsets 10 of the jaws J as they respectively move upwardly along the outer edges of the jaws J′ until they reach the angular camming surfaces 17 by which time the parts are approximately in the position shown in Fig. 2, the trigger 33 having, of course, been thrown outwardly away from the trap by the initial movement of the adjacent jaw. The closing movement of the jaws from fully open position until the time the offsets reach the bases of the camming surfaces 17 is extremely rapid, so that the jaws attain the position shown in Fig. 2, in which they are ready or just about ready to engage the animal's leg, almost instaneously after the trap is sprung. From this point on, the further closure of the jaws J′ is effected through the traverse of the angular camming surfaces 17 by the offsets 10 of the jaws J while the closure of the jaws J is directly effected by the spring as the coils 21, 27 thereof respectively travel up and along oppositely outwardly angularly directed camming surfaces 35 formed on the outer edges of the jaws in such positions that the spring will begin to ride thereon substantially simultaneously with the engagement of the offsets 10 with the camming surfaces 17. Thus, the final closing movement of both sets of jaws is effected with great power through the exertion of the force of the spring upon the several camming surfaces.

When the trap is either fully closed as shown in Fig. 3, or when the jaws are held slightly apart as when closed about the leg of an animal, the coils 21 and 27 of the spring bear such relation to the adjacent portions of the jaws J that it is impossible to pry the latter apart without first depressing the spring, and it is therefore impossible for the captured animal to force the jaws J open sufficiently to permit him to withdrawn his leg. Similarly, of course, as long as the jaws J are locked together, it is impossible for the jaws J′ to be forced apart since the offsets 10 by their engagement with the camming surfaces 17 oppose any opening movement of the jaws J′.

It will be observed, particularly from an inspection of Figs. 2 and 3, that as the jaws close on each other after reaching substantially the position shown in Fig. 2, the openings defined by the various notches in the jaws contract substantially symmetrically in all directions in a manner somewhat similar to the action of an iris diaphragm during its closing movement, with the result that the pressure of the jaws is brought to bear on the animal's leg, irrespective of its particular size, substantially entirely around the same and not merely at diametrically opposed points, so that the leg is very firmly held yet without danger of breakage, multilation or crushing and, in consequence, without undue or unnecessary pain to the animal. It will further be observed that the width of the lugs 2', 3' is not sufficiently great to prevent the coils of the spring from freely passing thereover when the spring is depressed and that the juxtaposed faces of the jaws in each pair are slightly inclined oppositely outward from the centers of the jaws toward their extremities so as to afford a gradually increasing clearance 36 between the jaws. This clearance is desirable in that it lessens the possibility of the jaws being prevented from properly closing through the lodgment of dirt, ice or the like between them adjacent their pivots.

It will thus be apparent that I have provided an animal trap of simple and compact construction which comprises but a relatively small number of parts and these of such nature that they readily lend themselves to economical manufacture and assembly, thus enabling the traps to be manufactured and marketed at relatively low cost. Additionally, the arrangement of the several parts is such that the closing movement of the jaws is initiated very rapidly after the trap is sprung and thereafter continued with increasing power yet in such a way as to center the animal's leg in the trap and thereafter grip and finally hold it very firmly yet with a minimum of pain and suffering to the animal, the jaws when in final position being firmly locked in such a way that they cannot be pried apart however the animal may struggle. Moreover, as the leg of the animal is substantially encircled and gripped by the jaws at all points, the holding power of the trap is very great while, when desired, the animal can be readily released or the trap set by pressing downward on the ends of the springs, conveniently through the medium of the ears 20 and 28 provided for that purpose.

While I have shown in the accompanying drawings and herein described with a considerable degree of particularity one embodiment of my invention as well as different forms of jaws which may be utilized therein, I do not thereby desire or intend to confine myself to any precise details of construction, arrangement of parts or method of assembly as the same may, if desired, be readily varied or modified from those to which I have more particularly referred without departing from the spirit and scope of the invention as defined in the appended claims.

Having thus described my invention, I claim and desire to protect by Letters Patent of the United States:

1. An animal trap comprising a base, two pairs of jaws respectively pivotally secured to the base, each jaw being of substantially arcuate contour and having a notch at the center of its inner edge, a spring arranged to directly actuate one of said pairs of jaws, means carried by said pair of jaws operative to actuate the other pair of jaws, and releasable means to hold all of the jaws in open position in opposition to the force of the spring.

2. An animal trap comprising a base, two pairs of jaws respectively pivotally connected with the base and disposed at right angles to each other, a spring operative to directly actuate one pair of jaws and comprising means for positively locking all of the jaws in closed position, means carried by said pair of jaws cooperative with means carried by the other pair of jaws to acuate the latter pair, and releasable means to hold all of the jaws in open position in opposition to the force of the spring.

3. An animal trap comprising a base, two pairs of jaws respectively pivoted to the base and disposed at right angles to each other, each jaw being of substantially arcuate contour and having a notch at the center of its inner edge, a spring having convolutions respectively surrounding the extremities of one pair of jaws and operative when released from compression to close said jaws, means carried by said jaws cooperative with means carried by the other pair of jaws for closing the latter simultaneously with the closing of the first pair, and releasable means for holding all of the jaws in open position and the spring in a state of compression.

4. An animal trap comprising a base, two pairs of jaws respectively pivoted to the base at their extremities and disposed at right angles to each other, the jaws of one pair being respectively provided with angularly disposed camming surfaces, means carried by the jaws of the other pair adapted by cooperation with said surfaces to move the jaws of the first mentioned pair toward closed position as the jaws of the second mentioned pair are approaching such position, a spring having convolutions surrounding the extremities of the second mentioned pair of jaws and directly cooperative with said jaws to effect their closure from open position, and releasable means for holding the jaws in open position against the force of the spring.

5. An animal trap comprising a base having two diametrically opposed pairs of lugs respectively arranged at right angles to each other, a pair of arcuate jaws pivoted at their extremities to one set of lugs, a pair of arcuate jaws pivoted at their extremities to the other set of lugs, the jaws of one of said pairs being respectively provided with angularly outwardly oppositely directed camming surfaces and the jaws of the other of said pairs being respectively provided with means adapted to engage said surfaces as the jaws approach closed position whereby the closure of the first set of jaws is effected from the other set, a spring secured to the base and having convolutions at its extremities adapted respectively to surround the extremities of the last mentioned jaws and directly effect the closure thereof, and releasable means for holding the jaws in open position against the force of the spring.

6. An animal trap comprising a base, two pairs of jaws respectively pivoted thereto at their extremities and disposed at right angles to each other, the jaws of one pair having outwardly oppositely angularly directed camming surfaces and the jaws of the other pair having means adapted to traverse said surfaces to effect the final closing movement of the first mentioned pair, a single spring secured at its center to the base and comprising adjacent its opposite ends convolutions respectively adapted to surround the second mentioned pair of jaws, said jaws having inclined camming surfaces on their outer edges adapted to be traversed by said convolutions during the final closing movement of said jaws, and releasable means operative to hold all of the jaws in open position in opposition to the spring.

7. An animal trap comprising a base, a pair of arcuate jaws pivoted thereto at their extremities, a second pair of arcuate jaws also pivoted thereto at their extremities and disposed at right angles to the first mentioned pair, each of the jaws having a three-sided notch at its center, means carried by the first pair of jaws and other means carried by the second pair mutually cooperative to effect closure of the first pair of jaws as the second pair is closed, a spring secured to the base and having convolutions adapted to surround the second pair of jaws and to directly effect the closure of said second pair when released from compression, and means for holding the spring in compression when the trap is set.

8. An animal trap comprising a base, a pair of jaws pivoted thereto, a second pair of jaws also pivoted thereto and disposed at right angles to the first pair, mutually cooperative means carried by the respective pairs of jaws adapted to effect closure of the first pair of jaws as the second pair is closed, and a spring secured to the base and directly cooperative with the second pair to close the same when released from compression and to positively lock said jaws in closed position, and means for holding the spring in compression when the trap is set.

9. An animal trap comprising a base, a pair of arcuate jaws pivoted thereto to open outwardly in opposite directions so as to occupy a substantially horizontal position when the trap is set, a second pair of jaws pivoted to the base at right angles to the first pair and similarly arranged to open outwardly to like position when the trap is set whereby the several jaws when open substantially define a circle, a spring secured to the base and having its major portion arranged to substantially conform to the contour of the jaws when the trap is set and oppositely disposed convolutions operative to engage the opposite sides of one pair of jaws and directly effect the closure thereof when the trap is sprung, and means for effecting the closure of the other pair of jaws from and substantially simultaneously with the first pair.

10. An animal trap comprising a base, a pair of arcuate jaws pivoted thereto to open outwardly in opposite directions so as to occupy a substantially horizontal position when the trap is set, a second pair of jaws pivoted to the base at right angles to the first pair and similarly arranged to open outwardly to like position when the trap is set whereby the several jaws when open substantially define a circle, a spring secured to the base and having its major portion arranged to substantially conform to the contour of the jaws when the trap is set and oppositely disposed convolutions operative to engage the opposite sides of one pair of jaws and directly effect the closure thereof when the trap is sprung, and means for effecting the closure of the other pair of jaws from and substantially simultaneously with the first pair, each jaw having a notch at the center of its inner edge whereby as the jaws approach closed position a substantially polygonal opening of progressively decreasing size is defined by the several jaws for the reception of the animal's leg.

11. An animal trap comprising a base, a pair of arcuate jaws pivoted thereto at their extremities, a second pair of arcuate jaws also pivoted to the base at their extremities and disposed at right angles to the first pair, each of the jaws of each pair being provided with a notch at the center of its inner edge, means respectively carried by said first and by said second pairs of jaws mutually cooperative to effect the closure of said first pair as said second pair are closed, a single spring secured to the base and embracing said second pair of jaws at opposed points to directly effect the closure thereof when released from compressed position, and releasable means for holding the spring in such position when the trap is set.

In witness whereof, I have hereunto set my hand this 10 day of April, 1929.

LEOPOLD C. SCHNEIDER.